(12) United States Patent
Lee et al.

(10) Patent No.: US 12,738,521 B2
(45) Date of Patent: Sep. 15, 2026

(54) METHOD FOR MANUFACTURING PROTONIC CERAMIC FUEL CELL AND PROTONIC CERAMIC FUEL CELL MANUFACTURED BY GIVEN METHOD

(71) Applicant: KOREA ADVANCED INSTITUTE OF SCIENCE AND TECHNOLOGY, Daejeon (KR)

(72) Inventors: Kang Taek Lee, Daejeon (KR); Kyeong Joon Kim, Daejeon (KR); Ha Ni Im, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 661 days.

(21) Appl. No.: 18/038,403

(22) PCT Filed: Nov. 30, 2021

(86) PCT No.: PCT/KR2021/017911
§ 371 (c)(1),
(2) Date: May 23, 2023

(87) PCT Pub. No.: WO2022/119284
PCT Pub. Date: Jun. 9, 2022

(65) Prior Publication Data

US 2024/0006641 A1 Jan. 4, 2024

(30) Foreign Application Priority Data

Dec. 4, 2020 (KR) ........................ 10-2020-0167951

(51) Int. Cl.

| | |
|---|---|
| ***H01M 8/1226*** | (2016.01) |
| ***H01M 8/1246*** | (2016.01) |
| *H01M 8/12* | (2016.01) |

(52) U.S. Cl.
CPC ....... *H01M 8/1226* (2013.01); *H01M 8/1246* (2013.01); *H01M 2008/1293* (2013.01); *H01M 2300/0074* (2013.01)

(58) Field of Classification Search
CPC ....... H01M 2008/1293; H01M 8/1226; H01M 8/1246
See application file for complete search history.

(56) References Cited

U.S. PATENT DOCUMENTS

| | | | | |
|---|---|---|---|---|
| 10,305,116 | B2 | 5/2019 | Tong et al. | |
| 2020/0119367 | A1 * | 4/2020 | Iijima | H01M 4/926 |

FOREIGN PATENT DOCUMENTS

| | | |
|---|---|---|
| JP | 2001-236969 A | 8/2001 |
| KR | 10-1439176 B1 | 9/2014 |

(Continued)

OTHER PUBLICATIONS

KR101439176B1 Machine translation (Year: 2025).*

(Continued)

*Primary Examiner* — Lingwen R Zeng
(74) *Attorney, Agent, or Firm* — Bridgeway IP Law Group, PLLC; Jihun Kim

(57) ABSTRACT

There is provided a method for manufacturing a protonic ceramic fuel cell, including: a first step of manufacturing an anode support slurry, an anode reaction layer slurry, and an electrolyte slurry; a second step of performing tape-casting of the respective slurries manufactured in the first step and manufacturing an anode support tape, an anode reaction layer tape, and an electrolyte tape; a third step of forming a lamination structure by sequentially laminating the anode support tape, the anode reaction layer tape, and the electrolyte tape manufactured in the second step; a fourth step of sintering the lamination structure formed in the third step through two steps of heat treatments at respective temperatures different from each other; a fifth step of forming a (Continued)

cathode at a surface of the lamination structure sintered in the fourth step at which the electrolyte tape is positioned; and a sixth step of co-sintering the lamination structure having the cathode formed in the fifth step.

13 Claims, 7 Drawing Sheets

(56) References Cited

FOREIGN PATENT DOCUMENTS

| | | | |
|---|---|---|---|
| KR | 10-2015-0009358 | A | 1/2015 |
| KR | 10-1892909 | B1 | 8/2018 |
| KR | 10-2019-0005083 | A | 1/2019 |

OTHER PUBLICATIONS

KR20190005083A Machine translation (Year: 2025).*

Xi Xu et al., "Highly-conductive proton-conducting electrolyte membranes with a low sintering temperature for solid oxide fuel cells", Journal of Membrane Science, 558 (2018) 17-25.

* cited by examiner (c)

(b)

(a)

(b)

(a)

(b)

(a)

METHOD FOR MANUFACTURING PROTONIC CERAMIC FUEL CELL AND PROTONIC CERAMIC FUEL CELL MANUFACTURED BY GIVEN METHOD

TECHNICAL FIELD

The present invention relates to a method for manufacturing a protonic ceramic fuel cell, and more specifically, to a method for manufacturing a protonic ceramic fuel cell (PCFC) by which a processing time is shortened by using tape-casting in manufacturing thereof and including a super-high speed slurry manufacturing process and a sintering process using a microwave furnace.

BACKGROUND ART

Recently, as issues of depletion of fossil fuels and treatment of waste matter which requires a long period of time are arising, development of environment-friendly energy converters is gaining interest. Of the environment-friendly energy converters, a fuel cell generates energy with higher efficiency than a conventional fossil-fuel-based power generation method and operates based on an electrochemical reaction through which water is produced, therefore being an environment-friendly energy converter with which various currently available energy converters can be replaced.

Hydrogen, which is mainly used as a fuel for the fuel cell, corresponds to a clean energy source that generates energy 2.75 times (122 KJ per 1 g of hydrogen) as much as energy generated by conventional gasoline and does not emit a greenhouse gas, and the fuel cell is advantageous in that an electricity generating facility is installed in a small area and is less affected by an external factor such as an effect of a climate, a weather, or an environment of an installation site than other energy generating facilities of environment-friendly energy such as wind power or solar power.

The fuel cell can be classified, depending on an electrolyte material, as a proton-exchange membrane fuel cell (PEMFC) using an ion-exchange polymer membrane as an electrolyte, a phosphoric acid fuel cells (PAFC) using liquid phosphoric acid, an alkaline fuel cell (AFC) using an alkaline electrolyte, a molten-carbonate fuel cell (MCFC) using molten carbonate, or a solid oxide fuel cell (SOFC) using a solid oxide.

Of the fuel cells, the solid oxide fuel cell (SOFC) using a ceramic material, which conducts oxygen ions, as the electrolyte has advantages of not only being the most highly efficient fuel cell of various types of fuel cells but also enabling waste heat due to a high operation temperature to be recycled; however, the operation temperature of about 800° C. to 1,000° C. can result in problems such as a limit to durability due to a difference in coefficient of thermal expansion between configurational elements of a fuel cell, a limit to materials which can be used as an electrode material, a high cost for maintaining a high-temperature operation environment, or a chemical reaction between configurational elements.

Recently, a protonic ceramic fuel cell (PCFC) that can operate at a lower temperature than the SOFC has attracted significant attraction as a new low-temperature fuel cell.

Meanwhile, tape-casting corresponds to a key technology in commercializing a solid oxide-based electrochemical device. The tape-casting is a process of loading slurry having optimal viscosity on a tape-casting device and forming the slurry into a tape shape having a certain thickness, enabling a uniform green tape to be continuously manufactured, and thus is advantageous in mass production thereof.

However, in performing the tape-casting, it requires a long time to manufacture slurry, and several steps of complicated heat treatment processes are to be performed to have a defect-free ceramic shape.

Further, in manufacturing the protonic ceramic fuel cell (PCFC), a protonic ceramic electrolyte material has a property that makes the electrolyte material difficult to be densified and needs a heat treatment process performed at a high temperature of 1,600° C. or above for a long time, and thus few studies on the tape-casting used in manufacturing a protonic ceramic fuel cell have been reported.

[Citation List][Patent Literature]

U.S. patent Ser. No. 10/305,116

SUMMARY OF INVENTION

Technical Problem

An object of the present invention to solve the above-described problems is to provide a method for manufacturing a protonic ceramic fuel cell, and more specifically, to a method for manufacturing a protonic ceramic fuel cell (PCFC) by which a processing time is shortened by using a tape-casting process and including a super-high speed slurry manufacturing process and a sintering process using a microwave furnace.

In addition, another object of the present invention is to provide a protonic ceramic fuel cell manufactured by the method described above.

Technical objects to be achieved by the present invention are not limited to the technical objects mentioned above, and the following description enables other unmentioned technical objects to be clearly understood by a person of ordinary skill in the art to which the present invention pertains.

Solution to Problem

According to an aspect of the present invention, there is provided a method for manufacturing a protonic ceramic fuel cell, including: a first step of manufacturing an anode support slurry, an anode reaction layer slurry, and an electrolyte slurry; a second step of performing tape-casting of the respective slurries manufactured in the first step and manufacturing an anode support tape, an anode reaction layer tape, and an electrolyte tape; a third step of forming a lamination structure by sequentially laminating the anode support tape, the anode reaction layer tape, and the electrolyte tape manufactured in the second step; a fourth step of sintering the lamination structure formed in the third step through two steps of heat treatments at respective temperatures different from each other; a fifth step of forming a cathode at a surface of the lamination structure sintered in the fourth step at which the electrolyte tape is positioned; and a sixth step of co-sintering the lamination structure having the cathode formed in the fifth step.

According to an embodiment of the present invention, the first step may be executed using resonant acoustic mixing.

According to the embodiment of the present invention, the anode support slurry may contain a complex of a $BaCeO_3$—$BaZrO_3$ solid mixture and NiO.

According to the embodiment of the present invention, the anode reaction layer slurry may contain a complex of a $BaCeO_3$—$BaZrO_3$ solid mixture and NiO.

According to the embodiment of the present invention, the electrolyte slurry may contain a $BaCeO_3$—$BaZrO_3$ solid mixture.

According to the embodiment of the present invention, the third step may be executed by sequentially laminating the anode support tape, the anode reaction layer tape, and the electrolyte tape, and pressing the sequentially laminated anode support tape, anode reaction layer tape, and electrolyte tape at a temperature of 100° C. to 140° C.

According to the embodiment of the present invention, the fourth step may be executed through a first heat treatment and a second heat treatment which are executed at respective temperatures different from each other, and the first heat treatment may be executed at a temperature of 800° C. to 1,000° C. for 12 hours to 20 hours.

According to the embodiment of the present invention, the second heat treatment may be executed using a microwave furnace.

According to the embodiment of the present invention, the second heat treatment may be executed at a temperature of 1,400° C. to 1,600° C. for 30 minutes to 120 minutes.

According to the embodiment of the present invention, the sixth step may be executed at a temperature of 800° C. to 900° C. for 90 minutes to 180 minutes.

According to the embodiment of the present invention, the method for manufacturing a protonic ceramic fuel cell may further include, between the second step and the third step, a step of cutting each of the anode support tape, the anode reaction layer tape, and the electrolyte tape manufactured in the second step.

According to the embodiment of the present invention, the method for manufacturing a protonic ceramic fuel cell may further include, between the third step and the fourth step, a step of curing the lamination structure manufactured in the third step at room temperature, and forming a shape of the lamination structure.

According to another aspect of the present invention, there is provided a protonic ceramic fuel cell manufactured in accordance with the method for manufacturing a protonic ceramic fuel cell.

Advantageous Effects of Invention

A method for manufacturing a protonic ceramic fuel cell of the present invention according to such a configuration described above has an advantage of enabling mass production as the method is executed using tape-casting, and another advantage of reducing the time needed for a slurry manufacturing process as a material substance slurry manufacturing process is executed using resonant acoustic mixing for the tape-casting.

In addition, the method for manufacturing a protonic ceramic fuel cell of the present invention has advantages of reducing the time for sintering and manufacturing an electrolyte having a dense structure as the method includes a sintering process using a microwave furnace.

Further, it is possible to reduce the time for collective processing of a process of manufacturing protonic ceramic fuel cell by reducing the time for manufacturing slurry and sintering.

The effects of the present invention are construed not to be limited to the above-described effects but to include every effect that can be derived from the configurations of the present invention described in detailed description or claims of the present invention.

DESCRIPTION OF EMBODIMENTS

Figure 1:
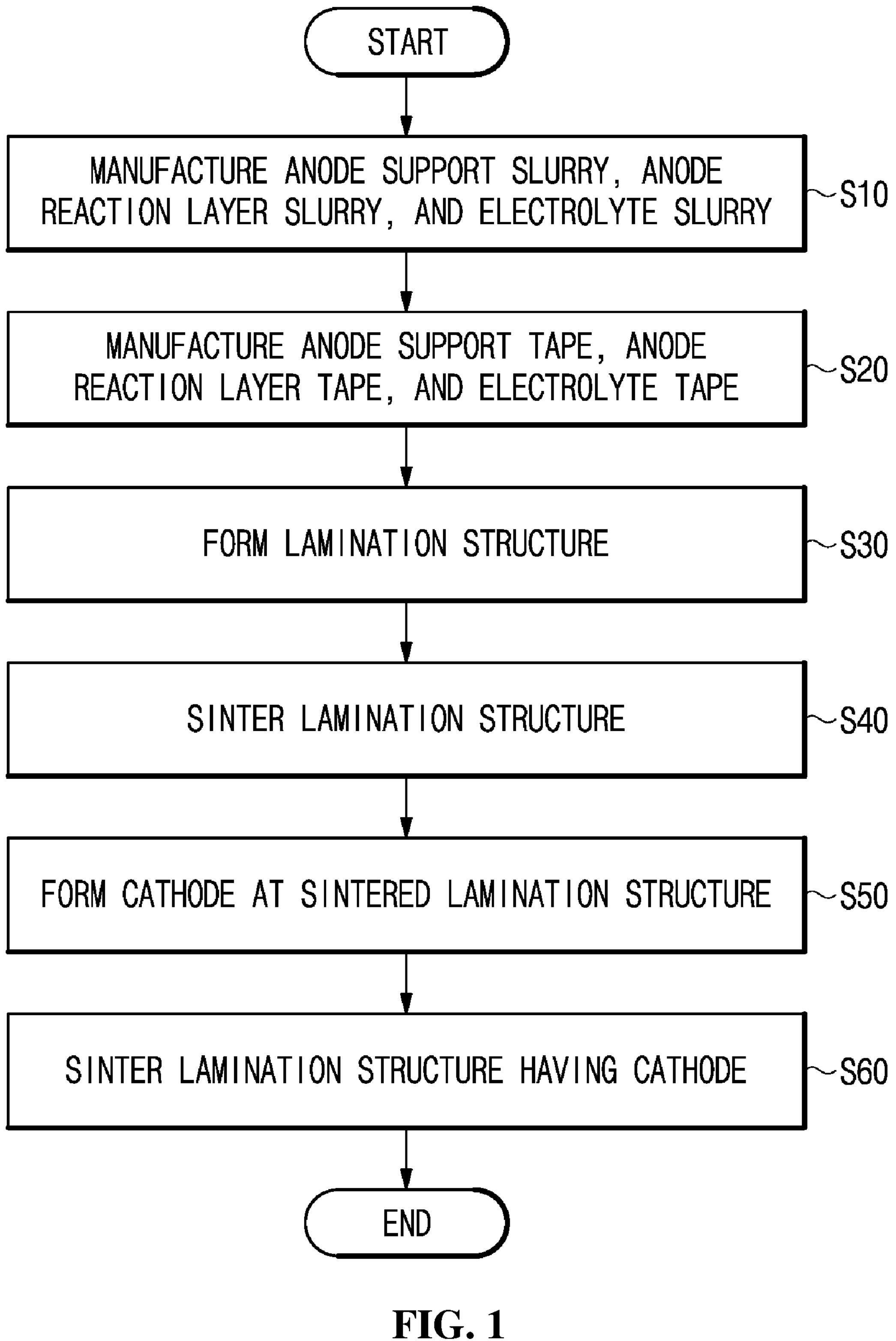
FIG. 1 is a flowchart of a method for manufacturing a protonic ceramic fuel cell of the present invention.

Hereinafter, the present invention will be described with reference to the accompanying drawings. However, the present invention can be realized as various different examples, thus is not limited to the embodiments described here. Further, a part unrelated to the description is omitted from the drawings in order to clearly illustrate the present invention, and similar reference signs are assigned to similar parts through the entire specification.

In the entire specification, a case where a certain part "is connected to (accesses, is in contact with, or is coupled to)" another part means not only a case where the parts are "directly connected" to each other, but also a case where the parts are "indirectly connected" to each other with an additional member interposed therebetween. In addition, when a certain part "comprises" a certain configurational element, this does not mean that another configurational element is excluded, but means that the configurational element can be further included, unless specifically described otherwise.

Terms used in this specification are used only to describe a specific embodiment and are not intentionally used to limit the present invention thereto. A word having a singular form represents both singular and plural forms of the word, unless obviously implied otherwise in context. In this specification, a term such as "to comprise" or "to have" is construed to specify that a feature, a number, a step, an operation, a configurational element, a part, or a combination thereof described in the specification is present and not to exclude presence or a possibility of addition of one or more other features, numbers, steps, operations, configurational elements, parts, or combinations thereof in advance.

Hereinafter, embodiments of the present invention will be described in detail with reference to the accompanying drawings.

According to an aspect of the present invention, there is provided a method for manufacturing a protonic ceramic fuel cell.

In this specification, the protonic ceramic fuel cell (PCFC) is a low-temperature fuel cell using a protonic ceramic oxide, and the protonic ceramic fuel cell is known to have a reaction represented by the following Formula 1.

$$2H_2 \rightarrow 4H^+ + 4e^- \text{ (Anode)}$$

$4H^+ + O_2 + 4e^- \rightarrow 2H_2O$ (Cathode)

$2H_2 + O_2 \rightarrow 2H_2O$ (Overall Reaction) [Equation 1]

With reference to Equation 1, in the protonic ceramic fuel cell, hydrogen supplied to an anode is separated into protons and electrons which move through an electrolyte and along a wire, respectively, and the protons passing through the electrolyte react with oxygen at a cathode and form water.

An electrochemical reaction in a conventional SOFC represents a phenomenon in which water is produced at an anode; however, in the PCFC, water produced through an electrochemical reaction is not produced at an anode to which a fuel is supplied, but is produced at a cathode, and thus there is no need to consider an effect of diluting the fuel such that the fuel can be more effectively used. Hence, the PCFC attracts attention as a new alternative to a low-temperature solid oxide fuel cell.

Meanwhile, $BaCeO_3$-based and $BaZrO_3$-based materials doped with a rare earth element of various protonic ceramics used in the PCFC are known to have relatively high proton conductivity in a medium and low temperature range. The $BaCeO_3$-based material is characterized by the highest proton conductivity, a relatively good sinterability, and a low phase stability in a water vapor and carbon dioxide atmosphere, whereas the $BaZrO_3$-based material is characterized by a relatively good phase stability, a good intragranular proton conductivity, a low sinterability, and a remarkably lower intergranular proton conductivity than the intragranular proton conductivity.

Consequently, studies on a $BaCeO_3$—$BaZrO_3$ solid mixture, which is expected to have all of the advantages of both the materials, are actively conducted; however, the $BaCeO_3$—$BaZrO_3$ solid mixture is often reported to have opposite physical property changes depending on a composition thereof, and thus there is a need for a study on a mixing method and optimal composition. In particular, the $BaCeO_3$—$BaZrO_3$ solid mixture is a material difficult to sinter. Hence, the manufacture of the protonic ceramic fuel cell by using the $BaCeO_3$—$BaZrO_3$ solid mixture has problems of a high sintering temperature, a complicated process, and a long processing time.

FIG. 1 is a flowchart of the method for manufacturing a protonic ceramic fuel cell of the present invention.

With reference to FIG. 1, the method for manufacturing a protonic ceramic fuel cell includes: a first step S10 of manufacturing an anode support slurry, an anode reaction layer slurry, and an electrolyte slurry; a second step S20 of performing tape-casting of the respective slurries manufactured in the first step S10 and manufacturing an anode support tape, an anode reaction layer tape, and an electrolyte tape; a third step S30 of forming a lamination structure by sequentially laminating the anode support tape, the anode reaction layer tape, and the electrolyte tape manufactured in the second step S20; a fourth step S40 of sintering the lamination structure formed in the third step S30 through two steps of heat treatments at respective temperatures different from each other; a fifth step S50 of forming a cathode at a surface of the lamination structure sintered in the fourth step S40 at which the electrolyte tape is positioned; and a sixth step S60 of co-sintering the lamination structure having the cathode formed in the fifth step S50.

First, the method for manufacturing a protonic ceramic fuel cell of the present invention includes the first step S10 of manufacturing the anode support slurry, the anode reaction layer slurry, and the electrolyte slurry.

According to an embodiment of the present invention, the first step S10 can be executed using resonant acoustic mixing (RAM).

According to the embodiment of the present invention, the first step S10 can be a step of mixing protonic ceramic powders, solvents, and the like of which the anode support slurry, the anode reaction layer slurry, and the electrolyte slurry are respectively made, using the RAM, and manufacturing the anode support slurry, the anode reaction layer slurry, and the electrolyte slurry.

The RAM is a method for mixing particles of a mixture by dispersing the particles thereof or crashing the particles thereof using a principle of acoustic resonance. More specifically, the RAM can induce the mixture to an acoustic resonance state using a natural resonant acoustic frequency at which the mixture can have a fine particle size. In this case, acoustic energy having the resonant acoustic frequency is accumulated in the particles of the mixture and causes the particles to be dispersed into mediums in or around a structure.

According to the present invention, the first step S10 can be a step of manufacturing the anode support slurry, the anode reaction layer slurry, and the electrolyte slurry by using the above-described principle, and thus it is possible to enhance dispersion and crushing of macroparticles and flocculated particles generated in a general mixing process can such that qualities of the slurries can be improved by uniform mixing.

According to the embodiment of the present invention, in the first step S10, a process of manufacturing the anode support slurry, the anode reaction layer slurry, and the electrolyte slurry by using the RAM can be executed for 20 minutes to 40 minutes, specifically for 30 minutes, and thus the process has an advantage of reduction in time for the slurry manufacturing process compared to a conventional slurry manufacturing process using a ball mill which is executed for about 72 hours.

According to the embodiment of the present invention, the anode support slurry, the anode reaction layer slurry, and the electrolyte slurry can contain protonic ceramic powder in common, for example, a $BaCeO_3$—$BaZrO_3$ solid mixture, for example, BZCYYb simultaneously doped with yttrium and ytterbium, specifically $BaZr_{0.5}Ce_{0.3}Y_{0.1}Yb_{0.1}O_3$.

Effects of using the $BaCeO_3$—$BaZrO_3$ solid mixture for the protonic ceramic fuel cell are as described above.

According to the specific embodiment, the anode support slurry can further contain NiO in the $BaCeO_3$—$BaZrO_3$ solid mixture, and the NiO can be reduced to Ni by a fuel supplied after cell fastening so as to fulfill a function of an electronically conductive material.

The anode support slurry can further contain at least one of a pore former, a binder, a plasticizer, a dispersant, and a solvent as necessary, and the pore former, the binder, the plasticizer, the dispersant, and the solvent are not particularly limited and can be common materials known in the art.

For example, based on the total wt % of the anode support slurry, a NiO—BZCYYb content can be 35 wt % to 55 wt %, a pore former content can be 5 wt % to 10 wt %, a binder and dispersant content can be 5 wt % to 10 wt %, a plasticizer content can be 5 wt % to 10 wt %, and a solvent content can be 25 wt % to 35 wt %.

According to the specific embodiment, the anode reaction layer slurry can further contain NiO in the $BaCeO_3$—$BaZrO_3$ solid mixture, and the NiO can be reduced to Ni by a fuel supplied after the cell fastening so as to fulfill a function of an electronically conductive material.

The anode reaction layer slurry can further contain at least one of a binder, a plasticizer, a dispersant, and a solvent as necessary, and the binder, the plasticizer, the dispersant, and the solvent are not particularly limited and can be conventional materials known in the art.

For example, based on the total wt % of the anode reaction layer slurry, a NiO—BZCYYb content can be 35 wt % to 55 wt %, a binder and dispersant content can be 5 wt % to 10 wt %, a plasticizer content can be 5 wt % to 10 wt %, and a solvent content can be 25 wt % to 35 wt %.

According to the specific embodiment, the electrolyte slurry can further contain at least one of a binder, a plasticizer, a dispersant, and a solvent as necessary, and the binder, the plasticizer, the dispersant, and the solvent are not particularly limited and can be common materials known in the art.

For example, based on the total wt % of the electrolyte slurry, a NiO—BZCYYb content can be 35 wt % to 55 wt %, a binder and dispersant content can be 5 wt % to 10 wt %, a plasticizer content can be 5 wt % to 10 wt %, and a solvent content can be 25 wt % to 35 wt %.

According to the embodiment of the present invention, the pore former contained in the anode support slurry can be a common material that can form a porous structure. Specifically, an example of the pore former can include at least one selected from the group consisting of diethylglycol, polyethylene glycol, polyvinylpyrrolidone (PVP), polyvinylalcohol, and polymethylmethacrylate (PMMA), but is not limited thereto.

According to the embodiment of the present invention, the solvent contained in each of the anode support slurry, the anode reaction layer slurry, and the electrolyte slurry can be used to control mixing of the protonic ceramic powder, the dispersant, the binder, the plasticizer, and the like, and fluidity of slurry compositions thereof. Specifically, an example of the solvent can include at least one selected from the group consisting of ethanol, toluene, triethylene glycol ethyl ether, ethylene glycol hexyl ether, diethylene glycol ethyl ether, tripropylene glycol methyl ether, ethylene glycol, and xylene, but is not limited thereto.

According to the embodiment of the present invention, the plasticizer contained in each of the anode support slurry, the anode reaction layer slurry, and the electrolyte slurry can be added to increase processability and flexibility of manufactured slurry compositions. Specifically, an example of the plasticizer can include at least one selected from the group consisting of dibutyl phthalate (DBP), di-2-ethylhexyl phthalate (DOP), diisononyl phthalate (DINP), diisodecyl phthalate (DIDP), butyl benzyl phthalate (BBP), glycerol, ethylene glycol, polyethylene glycol, dioctyl phthalate, triphenyl phosphate, trioyl phosphate, polyethylene glycol dimethyl ether, and dimethylformamide, but is not limited thereto.

According to the embodiment of the present invention, the dispersant contained in each of the anode support slurry, the anode reaction layer slurry, and the electrolyte slurry can be used to increase intra-solvent dispersibility of the protonic ceramic powder which is mixed with the solvent and can be a common dispersant. Specifically, an example of the dispersant can include at least one selected from the group consisting of polyethylene glycol ether, alkyl sulfonate, polycarboxylate, phosphoric acid ester, a Hypermer™KD-based dispersant, but is not limited thereto.

According to the embodiment of the present invention, an example of the binder contained in each of the anode support slurry, the anode reaction layer slurry, and the electrolyte slurry can include at least one selected from the group consisting of polyvinylbutyral (PVB), polyvinylalcohol (PVA), polyvinylpyrrolidone, polyethylene glycol, xylene, polyethylene, polypropylene, polystyrene, polyvinylidene chloride, polycarbonate, polyimide, and ethyl cellulose, but is not limited thereto.

According to the embodiment of the present invention, viscosity of the slurry can increase in proportion to the binder content when the binder content is increased with respect to the protonic ceramic powder, and viscosity of the slurry can decrease when the dispersant content is increased with respect to the protonic ceramic powder.

Consequently, the binder and dispersant content can be adjusted so as to have viscosity suitable for the tape-casting in the second step S20 to be described below.

Next, the method for manufacturing a protonic ceramic fuel cell of the present invention includes the second step S20 of performing the tape-casting of the respective slurries manufactured in the first step S10 and manufacturing the anode support tape, the anode reaction layer tape, and the electrolyte tape.

According to the embodiment of the present invention, the anode support tape, the anode reaction layer tape, and the electrolyte tape can be manufactured through the tape-casting by using the anode support slurry, the anode reaction layer slurry, and the electrolyte slurry manufactured in the first step S10.

According to the specific embodiment, manufacturing of the anode support tape can be executed including a process of coating a release film with the anode support slurry by using a doctor blade having a thickness of hundreds of micrometers (μm) to 1,000 μm, drying the coated release film, and peeling off the release film.

In this case, the drying can be performed at a temperature of 50° C. to 120° C. for 10 minutes or less, a type of release film is not particularly limited and, for example, a polyethylene (PET) carrier film coated with silicon (Si) can be used.

According to the embodiment of the present invention, the manufactured anode support tape can have an average thickness of 300 μm to 400 μm.

According to the specific embodiment, manufacturing of the anode reaction layer tape can be executed including a process of coating a release film with the anode reaction layer slurry by using a film applicator having a thickness of tens of micrometers (μm), drying the coated release film, and peeling off the release film.

In this case, the drying can be performed at a temperature of 50° C. to 120° C. for 10 minutes or less, a type of release film is not particularly limited and, for example, a polyethylene (PET) carrier film coated with silicon (Si) can be used.

According to the embodiment of the present invention, the manufactured anode reaction layer tape can have an average thickness of 20 μm to 25 μm.

According to the specific embodiment, manufacturing of the electrolyte tape can be executed including a process of coating a release film with the electrolyte slurry by using a film applicator having a thickness of tens of micrometers (μm), drying the coated release film, and peeling off the release film.

In this case, the drying can be performed at a temperature of 50° C. to 120° C. for 10 minutes or less, a type of release film is not particularly limited and, for example, a polyethylene (PET) carrier film coated with silicon (Si) can be used.

According to the embodiment of the present invention, the manufactured electrolyte tape can have an average thickness of 15 μm to 20 μm.

According to the embodiment of the present invention, the tapes manufactured in the second step S20 can be even without scattering, and thereby green tapes for mass production can be manufactured.

Next, the method for manufacturing a protonic ceramic fuel cell of the present invention includes the third step S30 of forming a lamination structure by sequentially laminating the anode support tape, the anode reaction layer tape, and the electrolyte tape manufactured in the second step S20.

According to the embodiment of the present invention, the method for manufacturing a protonic ceramic fuel cell may further include, between the second step S20 and the third step (S30), a step of cutting each of the anode support tape, the anode reaction layer tape, and the electrolyte tape manufactured in the second step S20.

The step of cutting each of the tapes can be executed to easily perform the lamination process of the third step S30 and can be executed by cutting the tapes into an appropriate size suitable for performing the lamination process.

According to the embodiment of the present invention, the third step S30 can be executed by sequentially laminating the anode support tape, the anode reaction layer tape, and the electrolyte tape, and pressing the sequentially laminated anode support tape, anode reaction layer tape, and electrolyte tape at a temperature of 100° C. to 140° C.

According to the specific embodiment, the third step S30 can be executed using a lamination device. For example, the anode support tape, the anode reaction layer tape, and the electrolyte tape which are each cut by an appropriate size such as 8×8 $cm^2$ are sequentially laminated to form the lamination structure, and the lamination structure can be loaded in the lamination device and can be pressed at 120° C. in four directions. The lamination structure generated in the process can have an anode support/anode reaction layer/electrolyte structure.

Next, the method for manufacturing a protonic ceramic fuel cell of the present invention includes the fourth step S40 of sintering the lamination structure formed in the third step S30 through two steps of heat treatments at respective temperatures different from each other.

According to the embodiment of the present invention, the method for manufacturing a protonic ceramic fuel cell can further include, between the third step S30 and the fourth step S40, a step of curing the lamination structure manufactured in the third step S30 at room temperature, and forming a shape of the lamination structure.

The curing at room temperature enables the softened lamination structure to have a desired shape, the forming of the shape thereof is performed to enable a heat treatment step of the fourth step S40 to be easily performed and determine a shape of the protonic ceramic fuel cell, and the shape of the lamination structure formed by the shape-forming process determine the shape of the protonic ceramic fuel cell to be manufactured afterward.

According to the embodiment of the present invention, the shape of the lamination structure formed in the shape-forming process is not limited thereto and can be a coin shape, a flat plate shape, a cylindrical shape, a hone shape, a sheet shape, or a laminated shape.

According to the embodiment of the present invention, the fourth step can include a first heat treatment and a second heat treatment which are executed at respective temperatures different from each other.

The $BaCeO_3$—$BaZrO_3$ solid mixture used in the method for manufacturing a protonic ceramic fuel cell is a material difficult to sinter, and thus problems of a high sintering temperature during sintering, a complicated process, and a long processing time arise.

According to the embodiment of the present invention, the first heat treatment can correspond to a pre-treatment process for inhibiting combustion of organic substances contained in the lamination structure and bending and cracking of the ceramic and can be performed at a temperature of 800° C. to 1,000° C., specifically at 900° C., for 12 hours to 20 hours, specifically for 18 hours.

The first heat treatment can be executed using a furnace commonly used in the technical field.

According to the embodiment of the present invention, the second heat treatment is performed to form a fine dense structure of the electrolyte and can be performed using a microwave furnace.

Figure 2:
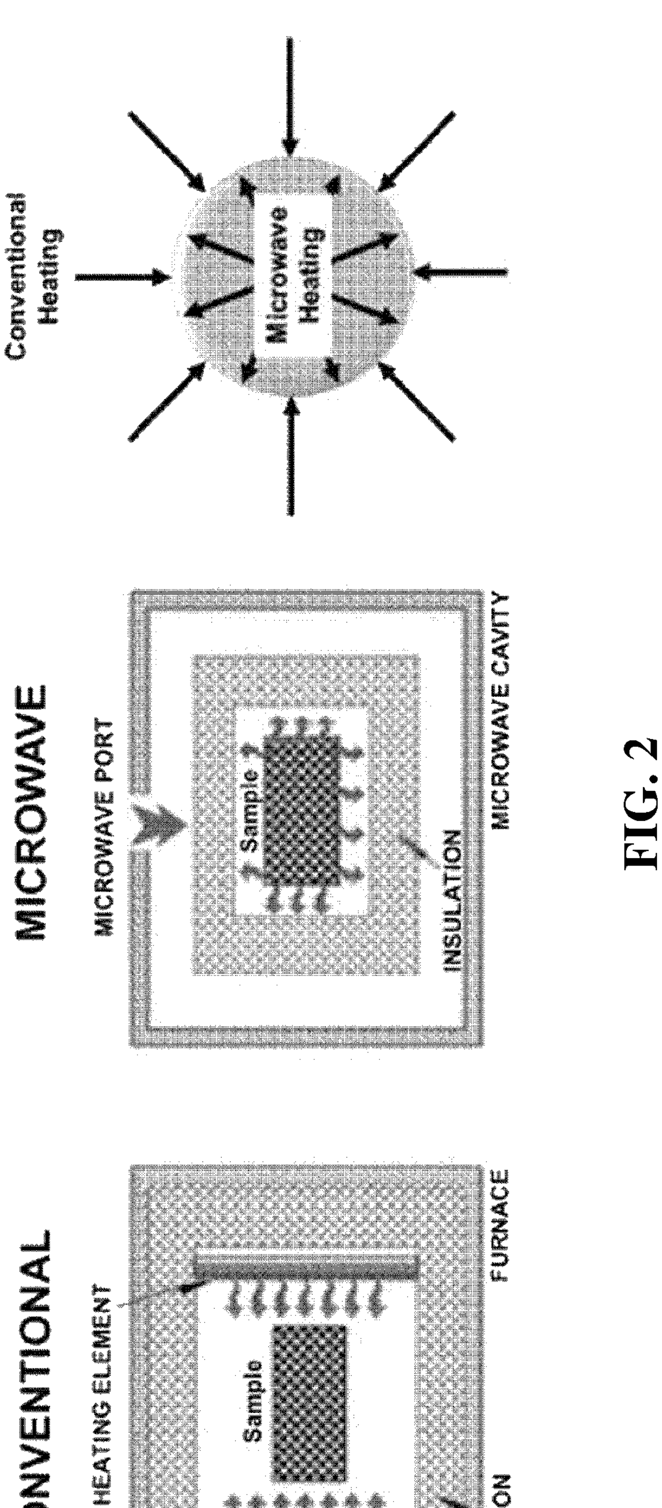
FIG. 2 is a schematic diagram illustrating a principle of a microwave sintering process using a microwave furnace.

FIG. 2 is a schematic diagram illustrating a principle of a microwave sintering process using the microwave furnace.

With reference to FIG. 2, the microwave sintering process is advantageous in that, since microwave causes a test sample to generate heat, a temperature gradient in the test sample is low to minimize a deformation or breaking phenomenon due to heat impact. In addition, since a temperature can be quickly selected and sintering can be performed only by maintaining the temperature for a short time of about 2 min, defects and a segregation phenomenon of the barium (Ba) are inhibited, and an electrolyte/cathode support reaction can be minimized.

According to the embodiment of the present invention, the second heat treatment can be executed at a temperature of 1,400° C. to 1,600° C., specifically, 1,500° C., for 30 min to 120 min, specifically, 120 min.

The method for manufacturing a protonic ceramic fuel cell of the present invention includes the fourth step having the first heat treatment and the second heat treatment has advantages of enabling a sintering time to be shortened.

Next, the method for manufacturing a protonic ceramic fuel cell of the present invention includes the fifth step S50 of forming a cathode at a surface of the lamination structure sintered in the fourth step S40 at which the electrolyte tape is positioned; and the sixth step S60 of co-sintering the lamination structure having the cathode formed in the fifth step S50.

According to the embodiment of the present invention, an example of the cathode can contain inorganic substances having an oxygen ion conductivity, such as lanthanum strontium cobalt ferrite (LSCF), specifically LSCF2882 ($La_{0.2}Sr_{0.8}Co_{0.8}Fe_{0.2}O_3$), but is not limited thereto.

In this case, the LSCF2882 can be mixed with the binder to manufacture an ink-like cathode material, and the fifth step S50 can be a step of applying the ink-like cathode material on the surface of the lamination structure sintered in the fourth step (S40) at which the electrolyte tape is positioned by using a screen printing method, but is not limited thereto.

The lamination structure having the cathode applied on the surface, at which the electrolyte tape is positioned, can be manufactured as a unit cell of the protonic ceramic fuel cell through the co-sintering process of the sixth step S60.

In this case, the unit cell of the protonic ceramic fuel cell can have an LSCF28821 BZCYYb|Ni—BZCYYb structure, for example.

According to the embodiment of the present invention, the sixth step S60 can be executed using a sintering furnace commonly used in the technical field at a temperature of 800° C. to 900° C., specifically 900° C., for 90 minutes to 180 minutes, specifically 120 minutes.

EXAMPLES

Manufacturing Example 1-1 Manufacture of Anode Support Slurry

NiO—BZCYYb ($BaZr_{0.5}Ce_{0.3}Y_{0.1}Yb_{0.1}O_3$) powder, a pore former, a binder, a plasticizer, and toluene were mixed using acoustic resonance for 30 minutes so as to become a slurry such that the anode support slurry was manufactured.

In this case, based on the total wt % of the anode support slurry, the NiO—BZCYYb content is 45 wt %, the pore former content is 6 wt %, the binder and dispersant content is 8 wt %, the plasticizer content is 9 wt %, and the solvent content is 32 wt %.

Manufacturing Example 1-2 Manufacture of Anode Reaction Layer Slurry

The anode reaction layer slurry was manufactured performing the same method as that in Manufacturing Example 1-1, except that the pore former is not contained, and that, based on the total wt % of the anode reaction layer slurry, the NiO—BZCYYb content is 43 wt %, the binder and dispersant content is 7 wt %, the plasticizer content is 6 wt %, and the solvent content is 44 wt %.

Manufacturing Example 1-3 Manufacture of Electrolyte Slurry

The electrolyte slurry was manufactured performing the same method as that in Manufacturing Example 1-1, except that BZCYYb ($BaZr_{0.5}Ce_{0.3}Y_{0.1}Yb_{0.1}O_3$) is used instead of NiO—BZCYYb ($BaZr_{0.5}Ce_{0.3}Y_{0.1}Yb_{0.1}O_3$) powder, the pore former is not contained, and, based on the total wt % of the electrolyte slurry, the BZCYYb content is 51 wt %, the binder and dispersant content is 9 wt %, the plasticizer content is 5 wt %, and the solvent content is 35 wt %.

Manufacturing Examples 2-1 to 2-3 Manufacture of Anode Support Tape, Anode Reaction Layer Tape, Electrolyte Tape The anode support tape, the anode reaction layer tape, and the electrolyte tape were manufactured by coating the anode support slurry, the anode reaction layer slurry, and the electrolyte slurry manufactured in Manufacturing Examples 1-1 to 1-3 on the polyethylene (PET) carrier film coated with silicon (Si) using a tape-casting device at room temperature.

In this case, the casting of the anode support tape was performed using a doctor blade having a thickness of hundreds of micrometers (μm) to 1,000 μm, and the castings of the anode reaction layer tape and the electrolyte tape were performed using a film applicator having a thickness of tens of micrometers (μm).

Conditions of the tape-casting and widths and thicknesses of the anode support tape, the anode reaction layer tape, and the electrolyte tape manufactured are shown in the following Table 1.

TABLE 1

| Conditions | Anode support tape | Anode reaction layer tape | Electrolyte tape |
|---|---|---|---|
| Doctor blade height (μm) | 70 | 20 | 15 |
| Tape-casting speed (rpm) | 200 | 200 | 200 |
| Width (cm) | 18 | 8 | 6 |

TABLE 1-continued

| Conditions | Anode support tape | Anode reaction layer tape | Electrolyte tape |
|---|---|---|---|
| Thickness (μm) | 300-400 | 20-25 | 15-20 |

Figure 3:
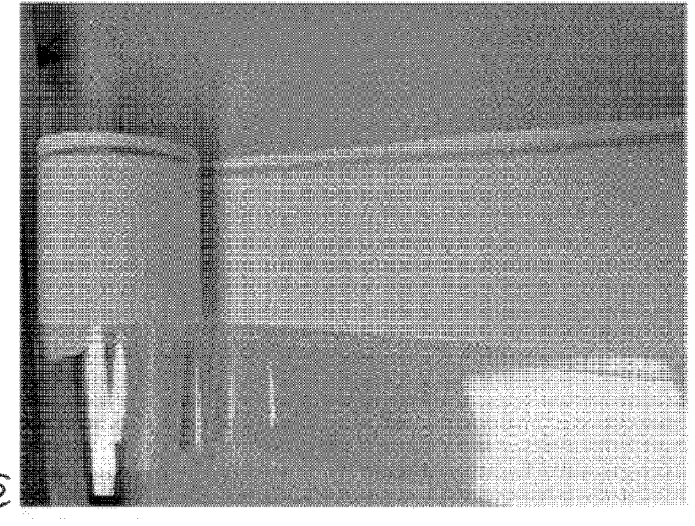
FIG. 3 illustrates pictures of an anode support tape (a), an anode reaction layer tape (b), and an electrolyte tape (c) manufactured according to an embodiment of the present invention.
Figure 3:
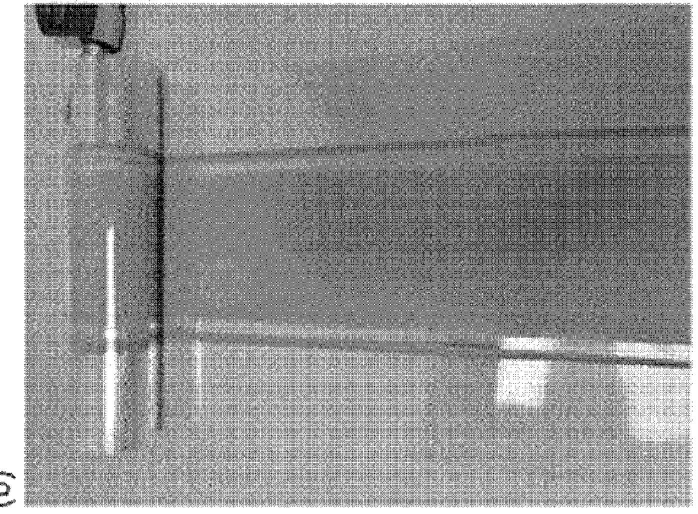
Figure 3:
Figure 3:
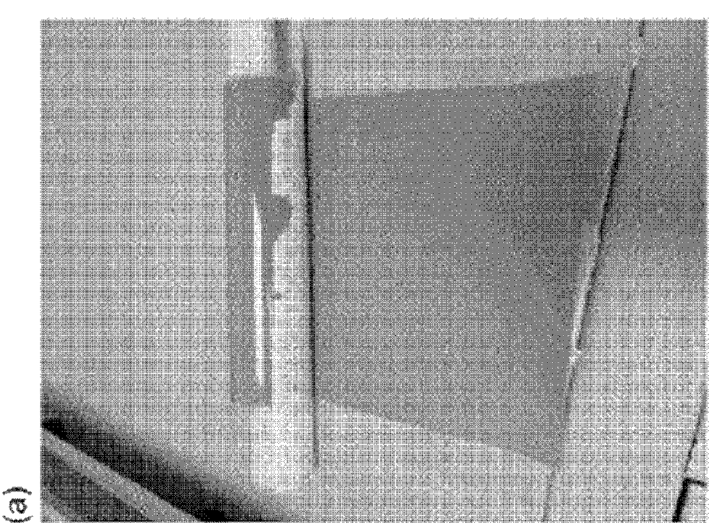

FIG. 3 illustrates pictures of the anode support tape (a), the anode reaction layer tape (b), and the electrolyte tape (c) manufactured in Manufacturing Examples 2-1 to 2-3. With reference to FIG. 3, the tapes can be observed to be even without scattering, and thereby confirming that green tapes for mass production can be manufactured by the tape-casting.

Example 1 Manufacture of Protonic Ceramic Fuel Cell

Lamination and Shape-Forming

The anode support tape, the anode reaction layer tape, and the electrolyte tape manufactured in Manufacturing Examples 2-1 to 2-3 were cut to have a size of 8×8 $cm^2$ and laminated sequentially to form the lamination structure, and then the lamination was performed by pressing the lamination structure. In this case, the lamination was performed in four directions at a fixed pressing temperature of 120° C., curing was performed at room temperature after the lamination, and the lamination structure is formed into a coin shape.

Sintering

A primary heat treatment was performed on the coin-shaped lamination structure at 900° C. for 18 hours in a furnace.

Figure 4:
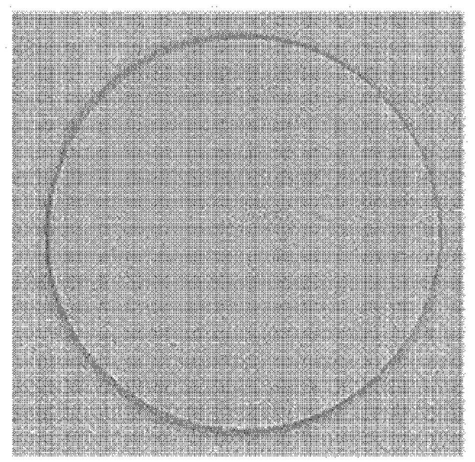
FIG. 4 illustrates a sintering profile graph (a) of a primary heat treatment process and a picture (b) of a primarily heat-treated lamination structure according to the embodiment of the present invention.
Figure 4:
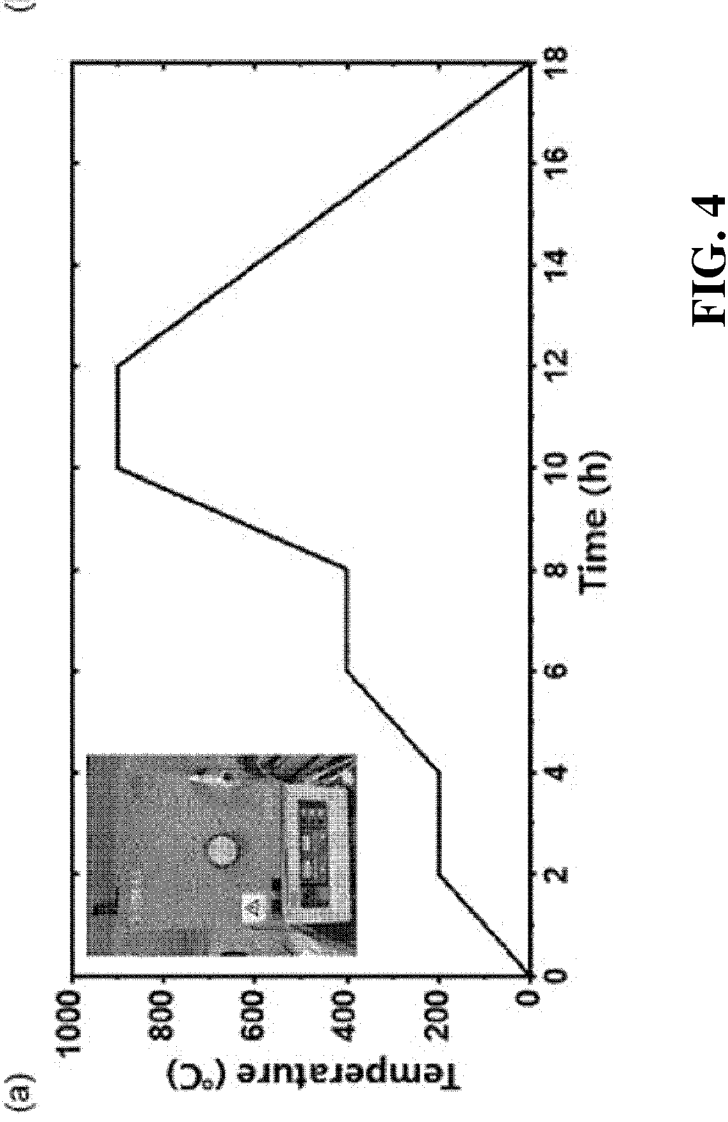

FIG. 4 illustrates a sintering profile graph (a) of a primary heat treatment process and a picture (b) of a primarily heat-treated lamination structure.

The secondary heat treatment was performed on the primarily heat-treated lamination structure at 1,500° C. for two hours in a microwave furnace.

Figure 5:
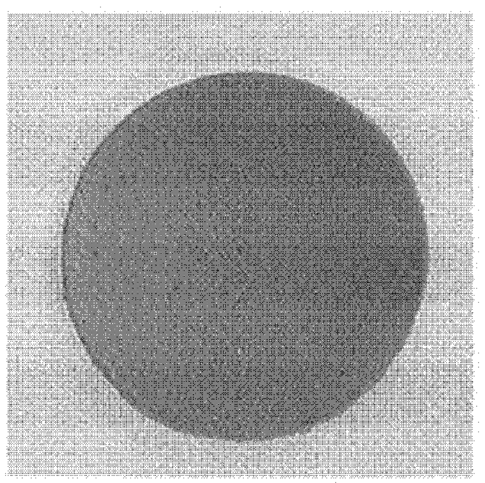
FIG. 5 illustrates a sintering profile graph (a) of a secondary heat treatment process and a picture (b) of a secondarily heat-treated lamination structure according to the embodiment of the present invention.
Figure 5:
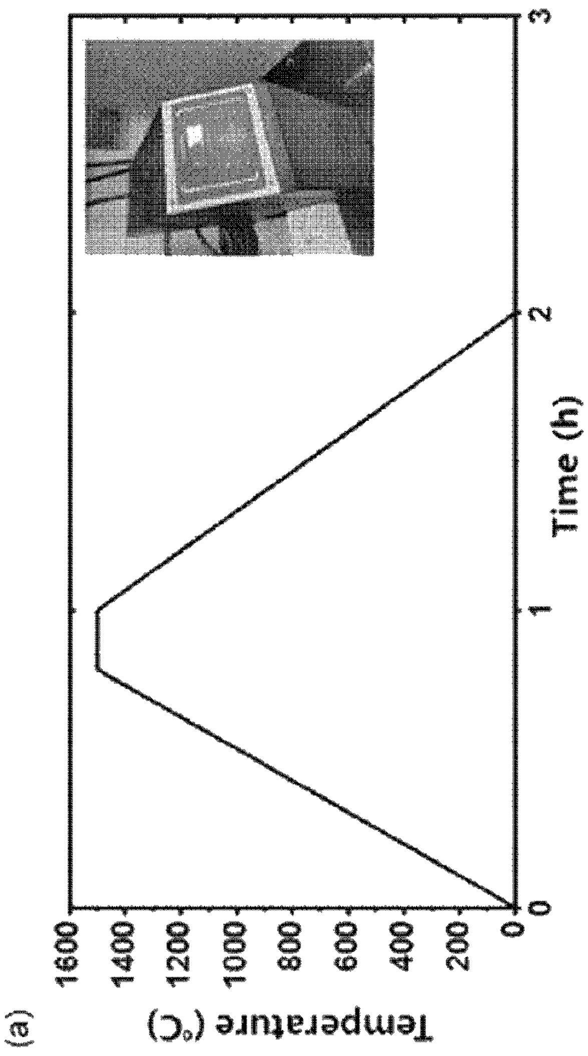

FIG. 5 illustrates a sintering profile graph (a) of a secondary heat treatment process and a picture (b) of a secondarily heat-treated lamination structure.

Manufacture of Unit Cell

ESL441 (Electroscience, USA) was mixed and stirred with LSCF2882 ($La_{0.2}Sr_{0.8}Co_{0.8}Fe_{0.2}O_3$) powder at a ratio of 1.5:1 to manufacture an ink-like cathode substance.

A unit cell having a configuration of LsCF2882|BZCYYb|Ni—BZCYYb was manufactured by applying the ink-like cathode substance on the surface of the electrolyte tape of the secondarily heat-treated lamination structure using a screen printer and performing the co-sintering at 900° C. for two hours.

Experimental Example 1 Evaluation of Electrochemical Characteristics

Current-voltage-power density and electrolyte and electrode resistance of the protonic ceramic fuel cell manufactured in Example 1 are measured at 500° C. (200 sccm of $H_2$ containing 3% of $H_2O$, 200 sccm of air), and a graph of a power density result obtained by using the measurement is shown in FIG. 6 and Table 2.

TABLE 2

| Cathode | OCV (V) | Ohmic resistance ($\Omega \cdot cm^2$) | Polarization resistance ($\Omega \cdot cm^2$) | MPD ($W/cm^2$) |
|---|---|---|---|---|
| LSCF2882 | 0.887 | 0.319 | 8.154 | 0.165 |

Figure 6:
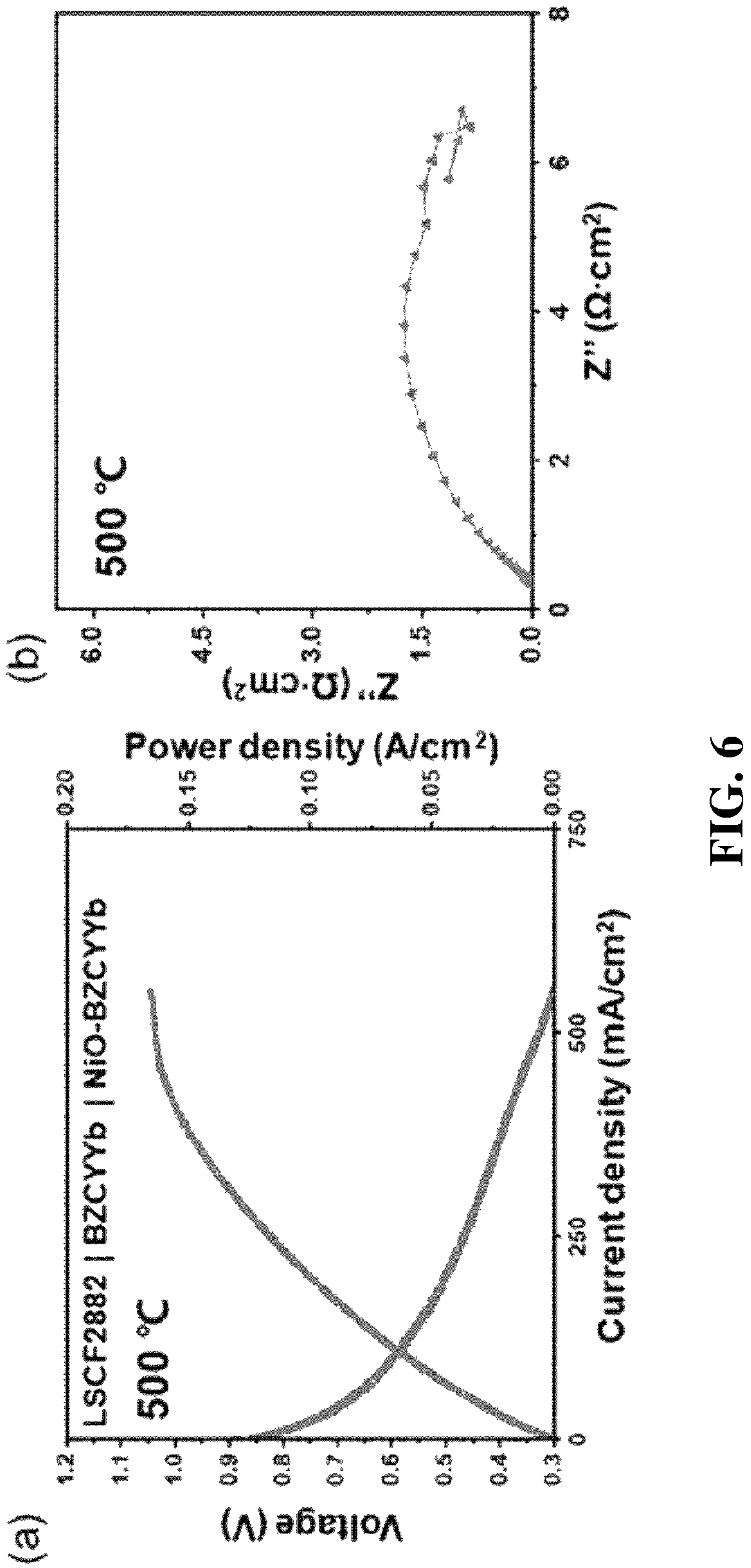
FIG. 6 illustrates a graph of a power density result obtained by measuring current-voltage-power density and electrolyte and electrode resistance of the protonic ceramic fuel cell according to the embodiment of the present invention.

With reference to FIG. 6 and Table 2, the maximum power density (MPD) is observed as 0.165 $W/cm^2$ at 500° C., the ohmic resistance is observed as 0.319 $\Omega \cdot cm^2$, and polarization resistance is observed as 8.154 $\Omega \cdot cm^2$.

Experimental Example 2 Confirmation of Cross-Sectional Area

Figure 7:
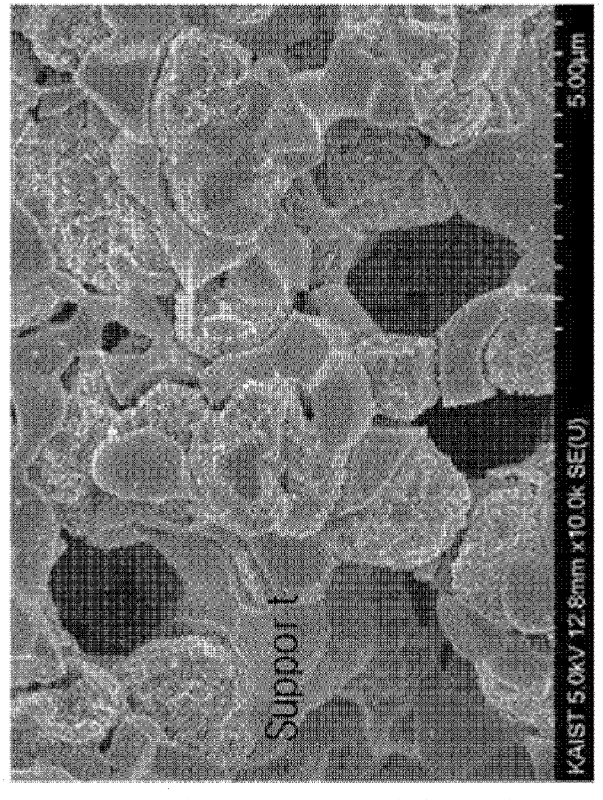
FIG. 7 illustrates an SEM image of a cross section of the protonic ceramic fuel cell according to the embodiment of the present invention.
Figure 7:
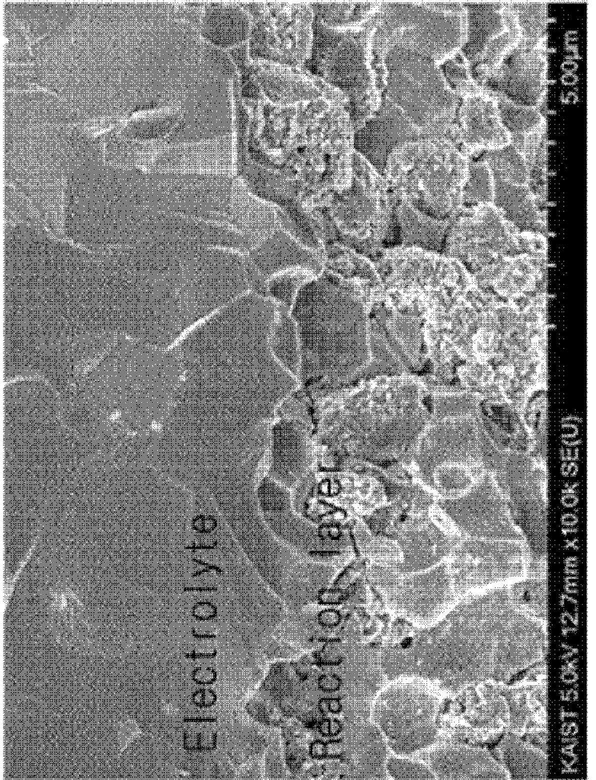

After the evaluation of the electrochemical characteristics in Experimental Example 1, a fine structure of a cross-section of the electrolyte and the anode reaction layer is checked, and an SEM image is illustrated in FIG. 7.

With reference to FIG. 7, it is confirmed that the electrolyte has a dense structure and the anode support has a porous structure, and confirming that the fine structures of the layers of the protonic ceramic fuel cell are desirably formed.

In addition, a bonding state between interfaces of the anode reaction layer and the electrolyte is excellent, and thus the protonic ceramic fuel cell proves to be successfully realized.

The description of the present invention described above is provided as an example, and a person of ordinary skill in the art to which the present invention pertains can understand that it is possible to easily modify the present invention to another embodiment without changing the technical idea or the essential feature of the present invention. Therefore, the embodiments described above need to be understood as exemplified embodiments and not as embodiments described to limit the present invention in every aspect. For example, the configurational elements described in a singular form may be realized in a distributed manner. Similarly, the configurational elements described in distributed manner may be realized in a combined manner.

The scope of the present invention is represented by the claims to be described below, and the meaning and the scope of the claims and every modified or altered example derived from the equivalent concept of the claims is to be construed to be included in the scope of the present invention.

The invention claimed is:

1. A method for manufacturing a protonic ceramic fuel cell, the method comprising:

a first step of manufacturing an anode support slurry, an anode reaction layer slurry, and an electrolyte slurry;

a second step of performing tape-casting of the anode support slurry, the anode reaction layer slurry, and the electrolyte slurry manufactured in the first step and manufacturing an anode support tape, an anode reaction layer tape, and an electrolyte tape;

a third step of forming a lamination structure by sequentially laminating the anode support tape, the anode reaction layer tape, and the electrolyte tape manufactured in the second step;

a fourth step of sintering the lamination structure formed in the third step through two steps of heat treatments at respective temperatures different from each other;

a fifth step of forming a cathode at a surface of the lamination structure sintered in the fourth step at which the electrolyte tape is positioned; and a sixth step of co-sintering the lamination structure having the cathode formed in the fifth step, wherein the fourth step is performed through a first heat treatment and a second heat treatment which are executed at respective temperatures different from each other, and the first heat treatment is executed at a temperature ranging from 800° C. to 1,000° C. for 12 hours to 20 hours.

2. The method for manufacturing the protonic ceramic fuel cell according to claim 1, wherein the first step is performed using resonant acoustic mixing.

3. The method for manufacturing the protonic ceramic fuel cell according to claim 1, wherein the anode support slurry contains a complex of a $BaCeO3$-$BaZrO3$ solid mixture and NiO.

4. The method for manufacturing the protonic ceramic fuel cell according to claim 1, wherein the anode reaction layer slurry contains a complex of a $BaCeO3$-$BaZrO3$ solid mixture and NiO.

5. The method for manufacturing the protonic ceramic fuel cell according to claim 1, wherein the electrolyte slurry contains a $BaCeO3$-$BaZrO3$ solid mixture.

6. The method for manufacturing the protonic ceramic fuel cell according to claim 1, wherein the third step is performed by sequentially laminating the anode support tape, the anode reaction layer tape, and the electrolyte tape, and pressing the sequentially laminated anode support tape, anode reaction layer tape, and electrolyte tape at a temperature ranging from 100° C. to 140° C.

7. The method for manufacturing the protonic ceramic fuel cell according to claim 1, wherein the second heat treatment is executed using a microwave furnace.

8. The method for manufacturing the protonic ceramic fuel cell according to claim 7, wherein the second heat treatment is executed at a temperature ranging from 1,400° C. to 1,600° C. for 30 minutes to 120 minutes.

9. The method for manufacturing the protonic ceramic fuel cell according to claim 1, wherein the sixth step is performed at a temperature ranging from 800° C. to 900° C. for 90 minutes to 180 minutes.

10. The method for manufacturing the protonic ceramic fuel cell according to claim 1, further comprising: between the second step and the third step, a step of cutting each of the anode support tape, the anode reaction layer tape, and the electrolyte tape manufactured in the second step.

11. The method for manufacturing the protonic ceramic fuel cell according to claim 1, further comprising: between the third step and the fourth step, a step of curing the lamination structure manufactured in the third step at room temperature and forming a shape of the lamination structure.

12. A protonic ceramic fuel cell manufactured in accordance with the method for manufacturing the protonic ceramic fuel cell according to claim 1.

13. A method for manufacturing a protonic ceramic fuel cell, the method comprising:

a first step of manufacturing an anode support slurry, an anode reaction layer slurry, and an electrolyte slurry;

a second step of performing tape-casting of the anode support slurry, the anode reaction layer slurry, and the electrolyte slurry manufactured in the first step and manufacturing an anode support tape, an anode reaction layer tape, and an electrolyte tape;

a third step of forming a lamination structure by sequentially laminating the anode support tape, the anode reaction layer tape, and the electrolyte tape manufactured in the second step;

a fourth step of sintering the lamination structure formed in the third step through two steps of heat treatments at respective temperatures different from each other;

a fifth step of forming a cathode at a surface of the lamination structure sintered in the fourth step at which the electrolyte tape is positioned; and a sixth step of co-sintering the lamination structure having the cathode formed in the fifth step, wherein the sixth step is performed at a temperature ranging from 800° C. to 900° C. for 90 minutes to 180 minutes.

* * * * *